US012586785B2

(12) United States Patent
Horikawa

(10) Patent No.: US 12,586,785 B2
(45) **Date of Patent: *Mar. 24, 2026**

(54) LITHIUM SECONDARY BATTERY

(71) Applicant: TOYOTA JIDOSHA KABUSHIKI KAISHA, Toyota (JP)

(72) Inventor: Daisuke Horikawa, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 68 days.

This patent is subject to a terminal disclaimer.

(21) Appl. No.: 18/441,050

(22) Filed: Feb. 14, 2024

(65) Prior Publication Data

US 2024/0421291 A1 Dec. 19, 2024

Related U.S. Application Data

(63) Continuation of application No. 17/987,051, filed on Nov. 15, 2022.

(30) Foreign Application Priority Data

Jan. 14, 2022 (JP) ................................. 2022-004055

(51) Int. Cl.
*H01M 4/40* (2006.01)
*H01M 4/02* (2006.01)
(Continued)

(52) U.S. Cl.
CPC ............. *H01M 4/405* (2013.01); *H01M 4/38* (2013.01); *H01M 4/386* (2013.01); *H01M 4/387* (2013.01);
(Continued)

(58) Field of Classification Search
CPC ...................................................... H01M 4/405
(Continued)

(56) References Cited

U.S. PATENT DOCUMENTS 5,498,495 A 3/1996 Takada et al.
2003/0129497 A1 7/2003 Yamamoto et al.
(Continued)

FOREIGN PATENT DOCUMENTS

CN 111864182 A 10/2020
CN 111864207 A 10/2020
(Continued)

OTHER PUBLICATIONS

Zhe Li, A review of lithium deposition in lithium-ion and lithium metal secondary batteries, May 15, 2014, vol. 254, pp. 168-182 (Year: 2014).*

(Continued)

*Primary Examiner* — Niki Bakhtiari
*Assistant Examiner* — Ryan K. Blackwell-Rudasill
(74) *Attorney, Agent, or Firm* — Oliff PLC

(57) ABSTRACT

A lithium secondary battery includes a positive electrode, and a negative electrode in which deposition and dissolution reactions of lithium metal occur. The negative electrode includes a negative electrode layer. The negative electrode layer contains, as a negative electrode active material, an alloy of the lithium metal and dissimilar metal. An element percentage of lithium element in the alloy is 40.00 atomic % or more and 99.97 atomic % or less when the lithium secondary battery is fully charged.

3 Claims, 1 Drawing Sheet

(51) Int. Cl.

| | |
|---|---|
| *H01M 4/04* | (2006.01) |
| *H01M 4/38* | (2006.01) |
| *H01M 4/42* | (2006.01) |
| *H01M 4/46* | (2006.01) |
| *H01M 4/48* | (2010.01) |
| *H01M 10/0525* | (2010.01) |

(52) U.S. Cl.
CPC ............. *H01M 4/42* (2013.01); *H01M 4/463* (2013.01); *H01M 4/466* (2013.01); *H01M 4/483* (2013.01); *H01M 10/0525* (2013.01); *H01M 2004/027* (2013.01); *H01M 4/0421* (2013.01)

(58) Field of Classification Search
USPC ......................................................... 429/219
See application file for complete search history.

(56) References Cited

U.S. PATENT DOCUMENTS

| | | |
|---|---|---|
| 2020/0343582 A1 | 10/2020 | Li et al. |
| 2020/0343583 A1* | 10/2020 | Li ..................... H01M 10/0562 |
| 2021/0066707 A1 | 3/2021 | Miyagi et al. |
| 2021/0119203 A1 | 4/2021 | Kim et al. |
| 2021/0143433 A1 | 5/2021 | Lee et al. |
| 2022/0093908 A1 | 3/2022 | Ritchie et al. |
| 2023/0231121 A1 | 7/2023 | Horikawa |
| 2024/0250246 A1 | 7/2024 | Horikawa |

FOREIGN PATENT DOCUMENTS

| | | |
|---|---|---|
| EP | 3819962 A1 | 5/2021 |
| JP | S63-133448 A | 6/1988 |
| JP | H07-288130 A | 10/1995 |
| JP | 2003-077461 A | 3/2003 |
| JP | 2003-162997 A | 6/2003 |
| JP | 2020-184513 A | 11/2020 |
| JP | 2021034199 A * | 3/2021 |
| JP | 2021-068706 A | 4/2021 |
| JP | 2021-077640 A | 5/2021 |
| KR | 2021-0047795 A | 4/2021 |
| WO | 2022/072959 A1 | 4/2022 |

OTHER PUBLICATIONS

A. L Santhosha, The Indium-Lithium Electrode in Solid-State Lithium-Ion Batteries: Phase Formation, Redox Potentials, and Interface Stability, 2019, Batteries and Super Caps, vol. 2, 524-529 (Year: 2019).*
22, 2025 U.S. Office Action issued in U.S. Appl. No. 17/987,051.
23, 2025 U.S. Notice of Allowance issued in U.S. Appl. No. 17/987,051.
U.S. Appl. No. 18/443,981, filed Feb. 16, 2024 in the name of Daisuke Horikawa.
Ziyang Lu et al., "Constructing a High-Strength Solid Electrolyte Layer by In Vivo Alloying with Aluminum for an Ultrahigh-Rate Lithium Metal Anode", Advanced Functional Materials, Wiley—V C H Verlag GmbH & Co. KGAA, DE, vol. 30, No. 7, Dec. 13, 2019, XP072406738.
Lin Yingxin et al., "Strengthening dendrite suppression in lithium metal anode by in-situ construction of Li-Zn alloy layer", Electro-chemistry Communications, Elsevier Amsterdam, NL, vol. 108, Oct. 21, 2019, XP085894106.
Apr. 16, 2025 Office Action issued in U.S. Appl. No. 17/978,366.
Feb. 25, 2025 Office Action issued in U.S. Appl. No. 18/443,981.
U.S. Appl. No. 17/987,051, filed Nov. 15, 2022, in the name of Daisuke Horikawa.

* cited by examiner

100
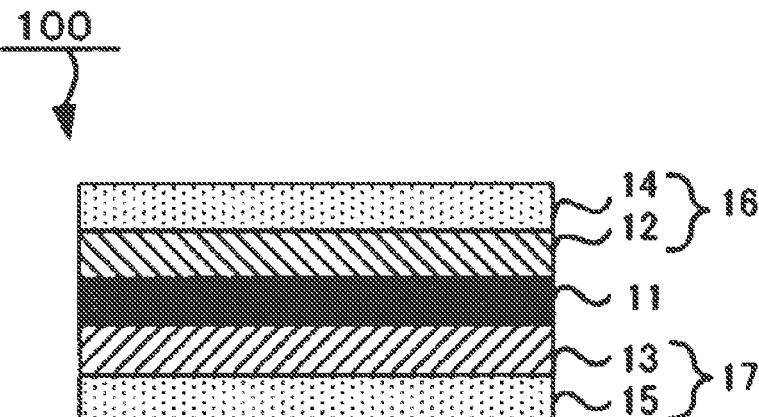

LITHIUM SECONDARY BATTERY

CROSS-REFERENCE TO RELATED APPLICATION

This is a Continuation of application Ser. No. 17/987,051 filed Nov. 15, 2022, which claims priority to Japanese Patent Application No. 2022-004055 filed on Jan. 14, 2022. The disclosure of the priority applications is incorporated herein by reference in its entirety.

BACKGROUND

1. Technical Field

The present disclosure relates to lithium secondary batteries.

2. Description of Related Art

Among batteries, lithium secondary batteries have been attracting attention due to their high output voltage.

Japanese Unexamined Patent Application Publication No. 2021-077640 (JP 2021-077640 A) discloses a negative electrode material that includes a metal thin film (gold (Au), magnesium (Mg), or silver (Ag)) at the interface between a lithium (Li) metal layer and a current collector.

Japanese Unexamined Patent Application Publication No. 2020-184513 (JP 2020-184513 A) discloses a Li metal negative electrode battery in which a metal Mg layer containing metal magnesium is formed on one surface of a negative electrode current collector or one surface of a solid electrolyte layer.

SUMMARY

In lithium secondary batteries using lithium metal, a lithium alloy, etc. as a negative electrode active material, the capacity retention rate may be reduced by deactivation of the lithium metal caused by a volume change of the lithium metal during charging and discharging, and improvement in capacity retention rate is desired.

The present disclosure provides a lithium secondary battery capable of improving the capacity retention rate.

A lithium secondary battery of one aspect of the present disclosure includes a positive electrode, and a negative electrode in which deposition and dissolution reactions of lithium metal occur.

The negative electrode includes a negative electrode layer.

The negative electrode layer contains, as a negative electrode active material, an alloy of the lithium metal and dissimilar metal.

An element percentage of lithium element in the alloy is 40.00 atomic % or more and 99.97atomic % or less when the lithium secondary battery is fully charged.

In the lithium secondary battery of the above aspect, the negative electrode layer may include an oxygen-enriched portion in which oxygen is enriched.

In the lithium secondary battery of the above aspect, a sectional area of the oxygen-enriched portion may be 1% or more and 60% or less when a sectional area of the negative electrode layer is taken as 100%.

In the lithium secondary battery of the above aspect, the dissimilar metal may be an element that is able to form a solid solution with the lithium metal or an element that is able to form an intermetallic compound with the lithium metal.

The present disclosure can provide a lithium secondary battery capable of improving the capacity retention rate.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic sectional view showing an example of a lithium secondary battery of the present disclosure.

DETAILED DESCRIPTION OF EMBODIMENTS

Hereinafter, an embodiment according to the present disclosure will be described. It should be noted that matters other than those specifically mentioned in the present specification and necessary to carry out the present disclosure (e.g., general configurations and manufacturing processes of a lithium secondary battery that do not characterize the present disclosure) may be regarded as design matters of those skilled in the art based on the related art. The present disclosure may be carried out based on the content disclosed in the present specification and the common general technical knowledge in the art.

The dimensional relationships (such as length, width, and thickness) in the drawing do not reflect the actual dimensional relationships.

In the present specification, a hyphen "-" or word "to" indicating a numerical range is used to mean an inclusive range in which the numerical values before and after "-" or "to" are included as its lower and upper limit values.

Any combination of values can be used as upper and lower limit values of a numerical range.

A lithium secondary battery of the present disclosure includes a positive electrode, and a negative electrode in which deposition and dissolution reactions of lithium metal occur.

The negative electrode includes a negative electrode layer.

The negative electrode layer contains, as a negative electrode active material, an alloy of the lithium metal and dissimilar metal.

The element percentage of lithium element in the alloy is 40.00 atomic % or more and 99.97 atomic % or less when the lithium secondary battery is fully charged.

In lithium secondary batteries, the capacity retention rate decreases because, for example, the nascent Li metal surface continuously generated by dissolution and deposition of Li metal during charging and discharging undergoes a decomposition reaction with an electrolyte and lone electrons of a negative electrode active material are generated by cracking of a negative electrode layer caused by a volume change of the Li metal during charging and discharging.

When a lithium secondary battery operates at low temperatures, the Li conductivity in an electrolyte solution or electrolyte decreases significantly and the resistance derived from the electrolyte solution or electrolyte increases, resulting in significant deterioration in low-temperature output characteristics.

According to the present disclosure, an increase in resistance component of the electrolyte solution or electrolyte is reduced, and high low-temperature output is obtained.

The negative electrode active material used in the present disclosure has particularly high affinity for a separator impregnated with an electrolyte solution, and conforms well to the separator during charging and discharging of the lithium secondary battery. Therefore, deactivation of the negative electrode active material due to local separation of the negative electrode active material from the separator can be reduced, and the capacity retention rate of the lithium secondary battery can be improved.

When there is an oxygen-enriched portion in the negative electrode layer, the negative electrode active material preferentially cracks starting from the oxygen-enriched portion, and the negative electrode layer has an increased number of cracks. In the related art, an increased number of cracks reduces the capacity retention rate of a lithium secondary battery. However, since cracks generated in the present disclosure are electrochemically inactive, the capacity retention rate is unlikely to decrease. Moreover, since cracks preferentially develop in the oxygen-enriched portion, cracks that reduce the capacity retention rate are less likely to occur, and the capacity retention rate is improved.

The lithium secondary battery of the present disclosure uses deposition and dissolution reactions of lithium metal as reactions of a negative electrode.

The lithium secondary battery of the present disclosure includes a positive electrode layer, a negative electrode layer, and an electrolyte layer located between the positive electrode layer and the negative electrode layer.

FIG. 1 is a schematic sectional view showing an example of the lithium secondary battery of the present disclosure.

As shown in FIG. 1, a lithium secondary battery 100 includes: a positive electrode 16 including a positive electrode layer 12 and a positive electrode current collector 14; a negative electrode 17 including a negative electrode layer 13 and a negative electrode current collector 15; and an electrolyte layer 11 located between the positive electrode layer 12 and the negative electrode layer 13.

Negative Electrode

The negative electrode of the present disclosure includes a negative electrode layer and typically further includes a negative electrode current collector.

Negative Electrode Layer

The negative electrode layer contains, as a negative electrode active material, an alloy of lithium metal and dissimilar metal.

The element percentage of lithium element in the alloy is 40.00 atomic % or more and 99.97 atomic % or less when the lithium secondary battery is fully charged.

In the present disclosure, the lithium secondary battery being fully charged means that the state of charge (SOC) of the lithium secondary battery is 100%. The SOC indicates the ratio of the remaining capacity to the full charge capacity of the battery, and the SOC for the full charge capacity is 100%.

The SOC may be estimated from, for example, the open-circuit voltage (OCV) of the lithium secondary battery.

The dissimilar metal may be any metal other than the lithium metal, and may be an element that is able to form a solid solution with the lithium metal or an element that is able to form an intermetallic compound with the lithium metal. The dissimilar metal may be, for example, one or more elements selected from the group consisting of magnesium (Mg), bismuth (Bi), palladium (Pd), tin (Sn), silicon (Si), gold (Au), silver (Ag), platinum (Pt), zinc (Zn), aluminum (Al), indium (In), strontium (Sr), barium (Ba), gallium (Ga), calcium (Ca), and germanium (Ge).

The negative electrode layer of the present disclosure may contain other negative electrode active material(s) as long as the negative electrode layer contains, as a main component, an alloy of the lithium metal and the dissimilar metal as a negative electrode active material. In the present disclosure, the "main component" means a component contained in an amount of 50% by mass or more when the total mass of the negative electrode layer is taken as 100% by mass.

The thickness of the negative electrode layer is not particularly limited, but may be, for example, 10 μm to 100 μm.

An example of a method for forming a negative electrode layer is a method in which lithium metal and dissimilar metal are simultaneously vacuum-deposited as a negative electrode active material on a negative electrode current collector.

An example of a method for simultaneously vacuum-depositing lithium metal and dissimilar metal on a negative electrode current collector is a method in which two crucibles, one containing lithium metal and one containing dissimilar metal, are prepared, and the crucibles are heated by electron beam heating or resistance heating so that the lithium metal and the dissimilar metal are simultaneously volatilized in a vacuum deposition apparatus and deposited on a negative electrode current collector.

The negative electrode layer may include at least one oxygen-enriched portion in which oxygen is enriched.

An example of a method for forming an oxygen-enriched portion is a method in which an oxide of dissimilar metal is vacuum-deposited as an oxygen-introducing compound on a negative electrode current collector when vacuum-depositing a negative electrode active material on a negative electrode current collector.

Examples of the oxygen-introducing compound include $MgO$, $Bi_2O_3$, $PdO$, $SnO$, $SiO_2$, $Au_2O_3$, $Ag_2O$, $PtO$, $ZnO$, $Al_2O_3$, $In_2O_3$, $SrO$, $BaO$, $Ga_2O_3$, $CaO$, and $GeO_2$.

From the standpoint of improving the capacity retention rate of the lithium secondary battery, the sectional area occupied by the oxygen-enriched portion may be 1% or more and 60% or less when the sectional area of the negative electrode layer is taken as 100%.

The position where the oxygen-enriched portion is formed in the negative electrode layer and the thickness of the oxygen-enriched portion may be controlled by adjusting the timing of pressurization with oxygen during deposition.

Negative Electrode Current Collector

The material of the negative electrode current collector may be a material that does not alloy with Li, and is, for example, SUS, copper, or nickel. The negative electrode current collector is in the form of, for example, foil or a plate. The shape of the negative electrode current collector as viewed in plan is not particularly limited, but is, for example, a circle, an ellipse, a rectangle, or any desired polygon. The thickness of the negative electrode current collector varies depending on the shape of the negative electrode current collector, but may be, for example, in the range of 1 μm to 50 μm or in the range of 5μm to 20 μm.

Positive Electrode

The positive electrode includes a positive electrode layer and a positive electrode current collector.

Positive Electrode Layer

The positive electrode layer contains a positive electrode active material, and may contain a solid electrolyte, an electrically conductive material, a binding agent (binder), etc. as optional components.

There is no particular limitation on the type of positive electrode active material, and any material that can be used as an active material for lithium secondary batteries can be used as a positive electrode active material. Examples of the positive electrode active material include lithium metal (Li), a lithium alloy, $LiCoO_2$, $LiNi_{0.8}Co_{0.15}Al_{0.05}O_2$, $LiNi_xCo_{1-x}O_2$ ($0<x<1$), $LiNi_{1/3}Co_{1/3}Mn_{1/3}O_2$, $LiMnO_2$, a heteroelement-substituted Li—Mn spinel, a lithium titanate, a lithium metal phosphate, LiCON, $Li_2SiO_3$, $Li_4SiO_4$, a transition metal oxide, $TiS_2$, Si, $SiO_2$, a silicon (Si) alloy, and a lithium-storable intermetallic compound. Examples of the heteroelement-substituted Li—Mn spinel include $LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$, and $LiMn_{1.5}Zn_{0.5}O_4$. An example of the lithium titanate is $Li_4Ti_5O_{12}$. Examples of the lithium metal phosphate include $LiFePO_4$, $LiMnPO_4$, $LiCoPO_4$, and $LiNiPO_4$. Examples of the transition metal oxide include $V_2O_5$ and $MoO_3$. Examples of the lithium-storable intermetallic compound include $Mg_2Sn$, $Mg_2Ge$, $Mg_2Sb$, and $Cu_3Sb$. Examples of the lithium alloy include Li—Au, Li—Mg, Li—Sn, Li—Si, Li—Al, Li—B, Li—C, Li—Ca, Li—Ga, Li—Ge, Li—As, Li—Se, Li—Ru, Li—Rh, Li—Pd, Li—Ag, Li—Cd, Li—In, Li—Sb, Li—Ir, Li—Pt, Li—Hg, Li—Pb, Li—Bi, Li—Zn, Li—Tl, Li—Te, and Li—At. Examples of the Si alloy include alloys of Si and a metal such as Li. The Si alloy may be an alloy of Si and at least one metal selected from the group consisting of Sn, Ge, and Al.

The form of the positive electrode active material is not particularly limited, but the positive electrode active material may be in the form of particles. When the positive electrode active material is in the form of particles, the positive electrode active material may be in the form of primary particles or secondary particles.

A coating layer containing an Li-ion conductive oxide may be formed on a surface of the positive electrode active material. This is because the coating layer can reduce the reaction between the positive electrode active material and the solid electrolyte. Examples of the Li-ion conductive oxide include $LiNbO_3$, $Li_4Ti_5O_{12}$, and $Li_3PO_4$. The thickness of the coating layer is, for example, 0.1 nm or more, and may be 1 nm or more. The thickness of the coating layer is, for example, 100 nm or less, and may be 20 nm or less. The coating layer may cover, for example, 70% or more of the surface of the positive electrode active material, or may cover 90% or more of the surface of the positive electrode active material.

Examples of the solid electrolyte are similar to solid electrolytes that will be mentioned later as examples for the solid electrolyte layer.

The electrically conductive material can be a known electrically conductive material. Examples of the electrically conductive material include a carbon material and metal particles. Examples of the carbon material include at least one selected from the group consisting of acetylene black, furnace black, vapor grown carbon fibers (VGCFs), carbon nanotubes, and carbon nanofibers. Among all, the carbon material may be at least one selected from the group consisting of VGCFs, carbon nanotubes, and carbon nanofibers from the standpoint of electron conduction properties. Examples of the metal particles include particles of nickel (Ni), copper (Cu), iron (Fe), and SUS.

The content of the electrically conductive material in the positive electrode layer is not particularly limited.

Examples of the binding agent (binder) include acrylonitrile butadiene rubber (ABR), butadiene rubber (BR), polyvinylidene fluoride (PVDF), and styrene butadiene rubber (SBR). The content of the binder in the positive electrode layer is not particularly limited.

The thickness of the positive electrode layer is not particularly limited, but may be, for example, 10 µm to 100 µm, or 10 µm to 20 µm.

For example, the positive electrode layer can be formed by adding a positive electrode active material and, as necessary, other component(s) to a solvent and stirring the resultant mixture to produce a positive electrode layer forming paste, and applying the paste to one surface of a support and drying the paste.

Examples of the solvent include butyl acetate, butyl butyrate, mesitylene, tetralin, heptane, and N-methyl-2-pyrrolidone (NMP).

A method for applying a positive electrode layer forming paste to one surface of a support is not particularly limited, and examples of this method include a doctor blade method, a metal mask printing method, an electrostatic spraying method, a dip coating method, a spray coating method, a roll coating method, a gravure coating method, and a screen printing method.

A material having self-supporting properties can be selected as appropriate and used as a support. The support is not particularly limited, and can be, for example, metal foil such as Cu or Al.

As another method for forming a positive electrode layer, the positive electrode layer may be formed by pressure-forming a powder of a positive electrode mixture including a positive electrode active material and, as necessary, other component(s). In the case of pressure-forming a powder of a positive electrode mixture, a press pressure of about 1 MPa or more and about 2000 MPa or less is usually applied to the powder.

The pressing method is not particularly limited, but is for example, a method in which a pressure is applied using a flat plate press, a roll press, etc.

Positive Electrode Current Collector

The positive electrode current collector can be a known metal that can be used as a current collector for lithium secondary batteries. Examples of such a metal include metal materials containing one or more elements selected from the group consisting of copper (Cu), nickel (Ni), aluminum (Al), vanadium (V), gold (Au), platinum (Pt), magnesium (Mg), iron (Fe), titanium (Ti), cobalt (Co), chromium (Cr), zinc (Zn), germanium (Ge), and indium (In). Examples of the positive electrode current collector include SUS, aluminum, nickel, iron, titanium, and carbon.

The form of the positive electrode current collector is not particularly limited, and the positive electrode current collector may be in various forms such as foil and mesh. The thickness of the positive electrode current collector varies depending on the shape of the positive electrode current collector, but may be, for example, in the range of 1 µm to 50 µm ors in the range of 5 µm to 20 µm.

Electrolyte Layer

The electrolyte layer contains at least an electrolyte.

The electrolyte can be an aqueous electrolyte solution, a non-aqueous electrolyte solution, a gel electrolyte, a solid electrolyte, etc. One of these electrolytes may be used alone, or two or more of these electrolytes may be used in combination.

The solvent of the aqueous electrolyte solution contains water as a main component. That is, water may account for 50 mol % or more, particularly 70 mol % or more, more particularly 90 mol % or more of the total amount of the solvent (liquid component) (100 mol %) of the electrolyte solution. The upper limit of the content of water in the solvent is not particularly limited.

The solvent contains water as a main component. However, the solvent may contain a solvent other than water. The solvent other than water is, for example, one or more selected from ethers, carbonates, nitriles, alcohols, ketones, amines, amides, sulfur compounds, and hydrocarbons. The solvent other than water may account for 50 mol % or less, particularly 30 mol % or less, more particularly 10 mol % or less of the total amount of the solvent (liquid component) (100 mol %) of the electrolyte solution.

The aqueous electrolyte solution used in the present disclosure contains an electrolyte. The electrolyte for the aqueous electrolyte solution is not particularly limited, but examples of the electrolyte include lithium salts, nitrates, acetates, and sulfates of imidic acid compounds. Specific examples of the electrolyte include lithium bis (fluorosulfonyl) imide (LiFSI; CAS No. 171611 Nov. 3), lithium bis (trifluoromethanesulfonyl) imide (LiTFSI; CAS No. 90076-65-6), lithium bis (pentafluoroethanesulfonyl) imide (Li-BETI; CAS No. 132843-44-8), lithium bis (nonafluorobutanesulfonyl) imide (CAS No. 119229-99-1), lithium nonafluoro-N-[(trifluoromethane)sulfonyl]butanesulfonyl-amide (CAS No. 176719-70-3), lithium N,N-hexafluoro-1, 3-disulfonylimide (CAS No. 189217-62-7), $CH_3COOLi$, $LiPF_6$, $LiBF_4$, $Li_2SO_4$, and $LiNO_3$.

The concentration of the electrolyte in the aqueous electrolyte solution can be set as appropriate within a range that does not exceed the saturation concentration of the electrolyte in the solvent, according to desired battery characteristics. This is because, if a solid electrolyte remains in an aqueous electrolyte solution, the solid may inhibit battery reactions.

For example, when LiTFSI is used as an electrolyte, the aqueous electrolyte solution may contain 1 mol or more, particularly 5 mol or more, more particularly 7.5 mol or more of LiTFSI per kilogram of the water. The upper limit of the concentration of the electrolyte is not particularly limited, and may be, for example, 25 mol or less per kilogram of the water.

An electrolyte solution containing a lithium salt and a non-aqueous solvent is usually used as a non-aqueous electrolyte solution.

Examples of the lithium salt include: inorganic lithium salts such as $LiPF_6$, $LiBF_4$, $LiClO_4$, and $LiAsF_6$; and organic lithium salts such as $LiCF_3SO_3$, $LiN(SO_2CF_3)_2$(Li-TFSI), $LIN(SO_2C_2F_5)_2$, and $LiC (SO_2CF_3)_3$.

Examples of the non-aqueous solvent include ethylene carbonate (EC), propylene carbonate (PC), butylene carbonate (BC), dimethyl carbonate (DMC), diethyl carbonate (DEC), ethyl methyl carbonate (EMC), γ-butyrolactone, sulfolane, acetonitrile (ACN), dimethoxymethane, 1,2-dimethoxyethane (DME), 1,3-dimethoxypropane, diethyl ether, tetraethylene glycol dimethyl ether (TEGDME), tetrahydrofuran, 2-methyl tetrahydrofuran, dimethyl sulfoxide (DMSO), and mixtures thereof. From the standpoint of ensuring a high dielectric constant and low viscosity, the non-aqueous solvent may be a mixture of a cyclic carbonate compound having a high dielectric constant and high viscosity such as EC, PC, or BC and a chain carbonate compound having a low dielectric constant and low viscosity such as DMC, DEC, or EMC, or may be a mixture of EC and DEC.

The concentration of the lithium salt in the non-aqueous electrolyte solution may be, for example, 0.3 M to 5 M.

The gel electrolyte is usually an electrolyte obtained by adding a polymer to a non-aqueous electrolyte solution for gelation.

Specifically, the gel electrolyte is obtained by adding a polymer such as polyethylene oxide, polypropylene oxide, polyacrylonitrile, polyvinylidene fluoride (PVDF), polyurethane, polyacrylate, or cellulose to the above non-aqueous electrolyte solution for gelation.

A separator that is impregnated with an electrolyte such as the above aqueous electrolyte solution and that suppresses the positive electrode layer and the negative electrode layer from contacting each other may be used in the electrolyte layer.

The material of the separator is not particularly limited as long as it is a porous film. Examples of the material of the separator include resins such as polyethylene (PE), polypropylene (PP), polyester, polyvinyl alcohol, cellulose, and polyamide. Among all, the material of the separator may be polyethylene and polypropylene. The separator may have a single-layer structure or a multi-layer structure. Examples of the separator having a multi-layer structure include a separator having a two-layer structure of PE/PP, and a separator having a three-layer structure of PP/PE/PP or PE/PP/PE.

The separator may be a non-woven fabric such as resin non-woven fabric or glass fiber non-woven fabric.

Solid Electrolyte Layer

The electrolyte layer may be a solid electrolyte layer composed of a solid. The solid electrolyte layer contains at least a solid electrolyte.

A known solid electrolyte that can be used in all-solid-state batteries can be used as appropriate as a solid electrolyte contained in the solid electrolyte layer. Examples of such a solid electrolyte include inorganic solid electrolytes such as sulfide-based solid electrolyte, oxide-based solid electrolyte, hydride-based solid electrolyte, halide-based solid electrolyte, and nitride-based solid electrolyte. The sulfide-based solid electrolyte may contain sulfur(S) as a main component of an anionic element. The oxide-based solid electrolyte may contain oxygen (O) as a main component of an anionic element. The hydride-based solid electrolyte may contain hydrogen (H) as a main component of an anionic element. The halide-based solid electrolyte may contain halogen (X) as a main component of an anionic element. The nitride-based solid electrolyte may contain nitrogen (N) as a main component of an anionic element.

The sulfide-based solid electrolyte may be sulfide glass, crystallized sulfide glass (glass-ceramic), or a crystalline material that is obtained by performing a solid-phase reaction process on a raw material composition.

The crystal state of the sulfide-based solid electrolyte can be checked by, for example, performing powder X-ray diffraction measurement of the sulfide-based solid electrolyte using CuK α radiation.

Sulfide glass can be obtained by amorphizing a raw material composition (e.g., a mixture of $Li_2S$ and $P_2S_5$). An example of the amorphization process is mechanical milling.

A glass-ceramic can be obtained by, for example, heat-treating sulfide glass.

The heat treatment temperature need only be higher than the crystallization temperature (Tc) observed by thermal analysis measurement of sulfide glass, and is usually 195° C. or higher. The upper limit of the heat treatment temperature is not particularly limited. The crystallization temperature (Tc) of sulfide glass can be measured by differential thermal analysis (DTA).

The heat treatment time is not particularly limited as long as desired crystallinity of the glass-ceramic can be obtained. For example, the heat treatment time is in the range of one minute to 24 hours, and particularly in the range of one minute to 10 hours.

The method of the heat treatment is not particularly limited, but is, for example, a method using a firing furnace.

An example of the oxide-based solid electrolyte is a solid electrolyte containing Li element, Y element (Y is at least one of the following elements: niobium (Nb), boron (B), aluminum (Al), silicon (Si), phosphorus (P), titanium (Ti), zirconium (Zr), molybdenum (Mo), tungsten (W), and sulfur (S)), and oxygen (O) element. Specific examples of the oxide-based solid electrolyte include: garnet solid electrolytes such as $Li_7La_3Zr_2O_{12}$, $Li_{7-x}La_3(Zr_{2-x}Nb_x)O_{12}$ ($0 \leq x \leq 2$), and $Li_5La_3Nb_2O_{12}$; perovskite solid electrolytes such as (Li, La)$TiO_3$, (Li, La)$NbO_3$, and (Li, Sr)(Ta, Zr)$O_3$; NASICON solid electrolytes such as Li (Al, Ti)$(PO_4)_3$ and Li (Al, Ga)$(PO_4)_3$; Li—P—O-based solid electrolytes such as $Li_3PO_4$ and LIPON (compound $Li_3PO_4$ with a part of O substituted with nitrogen (N)); and Li—B—O-based solid electrolytes such as $Li_3BO_3$ and compound $Li_3BO_3$ with a part of O substituted with carbon (C).

The hydride-based solid electrolyte contains, for example, Li and a complex anion containing hydrogen. Examples of the complex anion include $(BH_4)^-$, $(NH_2)^-$, $(AlH_4)^-$, and $(AlH_6)^{3-}$.

An example of the halide-based solid electrolyte is $Li_{6-3z}Y_zX_6$ (X is either or both of chlorine (Cl) and bromine (Br), and z satisfies $0<z<2$).

An example of the nitride-based solid electrolyte is $Li_3N$.

The solid electrolyte may be in the form of particles from the standpoint of their excellent handleability.

The average particle size of the particles of the solid electrolyte is not particularly limited, but is, for example, 10 nm or more, and may be 100 nm or more. The average particle size of the particles of the solid electrolyte is, for example, 25 μm or less, and may be 10 μm or less.

In the present disclosure, the average particle size of particles is a value of a volume-based median diameter (D50) measured by laser diffraction and scattering particle size distribution measurement, unless otherwise specified. In the present disclosure, the median diameter (D50) is a diameter (volume mean diameter) that splits the cumulative volume size distribution of particles with half above and half below this diameter (50%).

One solid electrolyte may be used alone, or two or more solid electrolytes may be used in combination. When two or more solid electrolytes are used, the two or more solid electrolytes may be mixed, or a multi-layer structure composed of two or more layers of the individual solid electrolytes may be formed.

The proportion of the solid electrolyte in the solid electrolyte layer is not particularly limited, but is, for example, 50% by mass or more, and may be 60% by mass or more and 100% by mass or less, may be 70% by mass or more and 100% by mass or less, or may be 100% by mass.

The solid electrolyte layer may contain a binding agent from the standpoint of causing the solid electrolyte layer to exhibit plasticity etc. Examples of such a binding agent include the materials mentioned above as examples of the binding agent for the positive electrode layer. The solid electrolyte layer may contain 5% by mass or less of the binding agent from the standpoint of, for example, suppressing excessive agglomeration of the solid electrolyte and enabling formation of a solid electrolyte layer containing a uniformly dispersed solid electrolyte in order to facilitate an increase in output power.

The thickness of the solid electrolyte layer is not particularly limited, and is usually 0.1 μm or more and 1 mm or less.

Examples of a method for forming a solid electrolyte layer include a method in which a solid electrolyte layer forming paste containing a solid electrolyte is applied to a support and dried, and a method in which a powder of a solid electrolyte material including a solid electrolyte is pressure-formed. Examples of the support are similar to the examples of the support mentioned above for the positive electrode layer. In the case of pressure-forming a powder of a solid electrolyte material, a press pressure of about 1 MPa or more and about 2000 MPa or less is usually applied to the powder.

The pressing method is not particularly limited, but examples of the pressing method are the methods mentioned above as examples for formation of the positive electrode layer.

The lithium secondary battery includes, as necessary, an exterior body that houses a stack of a positive electrode, an electrolyte layer, and a negative electrode, etc. The material of the exterior body is not particularly limited as long as it is stable against an electrolyte. Examples of the material of the exterior body include resins such as polypropylene, polyethylene, and acrylic resin.

The lithium secondary battery may be, for example, an aqueous lithium secondary battery, a non-aqueous lithium secondary battery, or an all-solid-state lithium secondary battery.

Examples of the shape of the lithium secondary battery include a coin, a laminate, a cylinder, and a quadrilateral prism.

Applications of the lithium secondary battery are not particularly limited, but include, for example, power supplies for vehicles such as hybrid electric vehicles (HEVs), plug-in hybrid electric vehicles (PHEVs), battery electric vehicles (BEVs), gasoline vehicles, and diesel vehicles. The lithium secondary battery may be used particularly for traction power supplies for hybrid electric vehicles, plug-in hybrid electric vehicles, or battery electric vehicles. The lithium secondary battery according to the present disclosure may be used as power supplies for moving bodies other than vehicles (e.g., trains, ships, and aircrafts), or may be used as power supplies for electrical products such as information processing devices.

In a method for manufacturing a lithium secondary battery according to the present disclosure, for example, a positive electrode layer is first formed by pressure-forming a powder of a positive electrode mixture including a positive electrode active material containing lithium element on one surface of a positive electrode current collector. A positive electrode is thus obtained. Next, a negative electrode active material is vacuum-deposited on a negative electrode current collector to form a negative electrode layer on one surface of the negative electrode current collector. A negative electrode is thus obtained. A separator is then prepared. The separator is placed between the positive electrode and the negative electrode, and an electrolyte solution is injected into the separator.

The lithium secondary battery of the present disclosure may be produced in this manner.

Comparative Example 1

Production of Positive Electrode

Particles of a lithium-nickel-cobalt-manganese complex oxide (layered structure, $LiNi_{0.33}Co_{0.33}Mn_{0.33}O_2$) with an average particle size of 10 μm as a positive electrode active material, acetylene black (AB) as an electrically conductive material, and polyvinylidene fluoride (PVDF) as a binder were weighed to the following mass ratio: positive electrode active material: AB:PVDF=80:8:2. Next, these materials were mixed in N-methyl-2-pyrrolidone (NMP) to a solid content of 56% by mass by a planetary mixer to prepare a positive electrode layer forming slurry. This positive electrode layer forming slurry was applied to a strip of aluminum foil (positive electrode current collector) in the longitudinal direction of the strip by a die coater, and dried at 120° C. The dried positive electrode layer forming slurry was pressed together with the aluminum foil. A strip of positive electrode having a positive electrode layer on a positive electrode current collector was thus produced.

Production of Negative Electrode

Li metal was volatilized in a vacuum deposition apparatus and deposited on Cu foil (negative electrode current collector). A strip of negative electrode having a negative electrode layer containing Li metal on a negative electrode current collector was thus produced.

Placement of Separator

The produced positive and negative electrodes were placed so as to face each other with a strip of separator (three-layer structure of PP/PE/PP) therebetween, and the stack thus obtained was wound in the longitudinal direction. A wound electrode body was thus produced. Thereafter, a positive electrode current collecting member was welded to the positive electrode, and a negative electrode current collecting member was welded to the negative electrode.

Preparation of Electrolyte Solution

A non-aqueous electrolyte solution was prepared by dissolving $LiPF_6$ as a supporting salt at a concentration of 1.0 M in a mixed solvent containing ethylene carbonate (EC) and dimethyl carbonate (DMC) at an EC-to-DMC volume ratio of 1:1.

The wound electrode body produced as described above and the non-aqueous electrolyte solution were placed into a battery case. A lithium secondary battery was thus assembled.

Comparative Examples 2 and 3, Example 1

A lithium secondary battery was assembled by a method similar to that of Comparative Example 1 except for the following points.

In the above section "Production of Negative Electrode," two crucibles, one containing Li metal and one containing Mg as dissimilar metal, were prepared, and the crucibles were heated by electron beam heating to simultaneously volatilize the Li metal and the dissimilar metal in a vacuum deposition apparatus and deposit the Li metal and the dissimilar metal on Cu foil (negative electrode current collector). A strip of negative electrode including a negative electrode layer containing an alloy of Li metal and dissimilar metal on a negative electrode current collector was thus produced. The element percentage of the Li metal in the alloy was controlled by controlling the temperature in the crucibles and the deposition time of the Li metal.

The element percentage of the Li metal in the alloy was 10 atomic % in Comparative Example 2, 30 atomic % in Comparative Example 3, and 40 atomic % in Example 1.

Examples 2 to 5

A lithium secondary battery was assembled by a method similar to that of Comparative Example 1 except for the following points.

In the above section "Production of Negative Electrode," three crucibles, one containing Li metal, one containing Mg as dissimilar metal, and one containing an oxygen-introducing compound (oxide of dissimilar metal element, MgO), were prepared, and the crucibles were heated by electron beam heating to simultaneously volatilize the Li metal, the dissimilar metal, and the oxygen-introducing compound in a vacuum deposition apparatus and deposit the Li metal, the dissimilar metal, and the oxygen-introducing compound on Cu foil (negative electrode current collector). A strip of negative electrode including, on a negative electrode current collector, a negative electrode layer containing an alloy of Li metal and dissimilar metal and including an oxygen-enriched portion was thus produced. The element percentage of the Li metal in the alloy was controlled by controlling the temperature in the crucibles and the deposition time of the Li metal.

The element percentage of the Li metal in the alloy was 40 atomic % in Example 2, 70 atomic % in Example 3, 90 atomic % in Example 4, and 99.97 atomic % in Example 5.

The deposition amount of the oxygen-introducing compound was controlled so that the sectional area occupied by the oxygen-enriched portion when the sectional area of the negative electrode layer in a section obtained when the negative electrode layer was cut was taken as 100% (sectional area of the oxygen-enriched portion/sectional area of the negative electrode layer × 100) became 2%. The position where the oxygen-enriched portion was formed and the thickness of the oxygen-enriched portion were controlled by adjusting the timing of pressurization with oxygen during deposition.

Examples 6 to 20

In Examples 6 to 20, as shown in Table 1, a lithium secondary battery was assembled by a method similar to that of Example 5 except for the type of dissimilar metal used. The oxygen-introducing compounds used in Examples 6 to 20 were oxides of the dissimilar metal elements used in Examples 6 to 20.

Examples 21 to 25

In Examples 21 to 25, as shown in Table 2, a lithium secondary battery was assembled by a method similar to that of Example 5 except for the sectional area occupied by the oxygen-enriched portion when the sectional area of the negative electrode layer in a section obtained when the negative electrode layer was cut was taken as 100% (sectional area of the oxygen-enriched portion/sectional area of the negative electrode layer×100).

Evaluation of Output Characteristics

The voltage (open-circuit voltage) of the lithium secondary battery was adjusted to 3.70 V in advance. The lithium secondary battery was then discharged at 5C for eight seconds in a low temperature environment of −5° C. As used herein, "1C" means a current value capable of charging the battery capacity (Ah) predicted from the theoretical capacity of an active material in one hour. A voltage drop AV at this time was acquired, and a resistance value was calculated using the following expression (1).

$$resistance=AV/current\ value\ of\ 5C \qquad \text{Expression (1):}$$

Tables 1 and 2 show the calculation results of the battery resistances of Examples 1 to 25 with respect to the battery resistance of Comparative Example 1, where the battery resistance of Comparative Example 1 was normalized to 1.0. Upward arrows in the tables mean the "same as above."

13

Evaluation of Capacity Retention Rate

A cycle test was performed on the lithium secondary batteries in an environment of 60° C. in the voltage range of 3.3 V to 4.2 V. Charging and discharging were performed by a constant current method at a current rate of 1C.

The lithium secondary batteries produced as described above were charged with a constant current (CC) at a rate of 1C in an environment of 60° C. until the voltage reached 4.2 V, and then charged with a constant voltage (CV) until the current reached 1/20C. Thereafter, the lithium secondary batteries were discharged with a constant current (CC) at a rate of 1C until the voltage reached 3.3 V. The discharge capacity at this time was taken as an initial discharge capacity.

The discharge capacity at the 200th cycle of the cycle test was measured by the same method as that for the initial discharge capacity, and the capacity retention rate after the charge and discharge cycle was calculated by dividing the discharge capacity at the 200th cycle of the cycle test by the initial discharge capacity. The results are shown in Tables 1 and 2.

Evaluation of Capacity Retention Rate after Storage

The lithium secondary batteries of Examples 1 to 25 and Comparative Examples 1 to 3 were charged to 3.8 V and were stored in a constant temperature bath in an environment of 60° C. for 100 days, and the capacity retention rate after storage (discharge capacity after storage/discharge capacity before storage×100) was calculated. Charging and discharging were performed by a constant current method at a current rate of 1C in an environment of 60° C. in the voltage range of 3 V to 4.2 V. The results are shown in Tables 1and 2.

TABLE 1

| | Dissimilar Metal Element | Li Element Percentage in Alloy (atm %) | Sectional Area of Oxygen-Enriched Portion/ Sectional Area of Negative Electrode Layer × 100 (%) | Capacity Retention Rate (%) | Capacity Retention Rate after Storage (%) | Normalized Battery Resistance (Low Temperature) |
|---|---|---|---|---|---|---|
| Comparative Example 1 | None | 100 | 0 | 50 | 52.1 | 1 |
| Comparative Example 2 | Mg | 10.00 | ↑ | 59.1 | 53.2 | 0.86 |
| Comparative Example 3 | ↑ | 30.00 | ↑ | 60.3 | 65.1 | 0.88 |
| Example 1 | ↑ | 40.00 | ↑ | 63.4 | 67.8 | 0.81 |
| Example 2 | ↑ | 40.00 | 2 | 74.4 | 80.1 | 0.54 |
| Example 3 | ↑ | 70.00 | ↑ | 75.3 | 79.5 | 0.52 |
| Example 4 | ↑ | 90.00 | ↑ | 74.2 | 79.3 | 0.54 |
| Example 5 | ↑ | 99.97 | ↑ | 75.5 | 80.2 | 0.51 |
| Example 6 | Bi | ↑ | ↑ | 75.3 | 81.2 | 0.53 |
| Example 7 | Pd | ↑ | ↑ | 74.3 | 79.9 | 0.56 |
| Example 8 | Sn | ↑ | ↑ | 73.9 | 80.2 | 0.52 |
| Example 9 | Si | ↑ | ↑ | 75.4 | 79.5 | 0.57 |
| Example 10 | Au | ↑ | ↑ | 75.6 | 79.2 | 0.51 |
| Example 11 | Ag | ↑ | ↑ | 76.1 | 79.3 | 0.55 |
| Example 12 | Pt | ↑ | ↑ | 75.1 | 79.4 | 0.56 |
| Example 13 | Zn | ↑ | ↑ | 75.4 | 79.5 | 0.51 |
| Example 14 | Al | ↑ | ↑ | 74.6 | 79.1 | 0.53 |
| Example 15 | In | ↑ | ↑ | 74.3 | 79.9 | 0.55 |
| Example 16 | Sr | ↑ | ↑ | 76.2 | 80.9 | 0.59 |
| Example 17 | Ba | ↑ | ↑ | 75.9 | 80.4 | 0.51 |
| Example 18 | Ga | ↑ | ↑ | 75.4 | 79.5 | 0.53 |
| Example 19 | Ca | ↑ | ↑ | 75.2 | 80.5 | 0.51 |
| Example 20 | Ge | ↑ | ↑ | 75 | 80.3 | 0.53 |

TABLE 2

| | Dissimilar Metal Element | Li Element Percentage in Alloy (atm %) | Sectional Area of Oxygen-Enriched Portion/ Sectional Area of Negative Electrode Layer × 100 (%) | Capacity Retention Rate (%) | Capacity Retention Rate after Storage (%) | Normalized Battery Resistance (Low Temperature) |
|---|---|---|---|---|---|---|
| Example 21 | Mg | 99.97 | 1 | 69.8 | 70.1 | 0.72 |
| Example 5 | ↑ | ↑ | 2 | 75.5 | 80.2 | 0.51 |
| Example 22 | ↑ | ↑ | 10 | 75.9 | 80.1 | 0.52 |
| Example 23 | ↑ | ↑ | 30 | 75.4 | 81.2 | 0.54 |
| Example 24 | ↑ | ↑ | 50 | 75.8 | 80.9 | 0.5 |
| Example 25 | ↑ | ↑ | 60 | 68.8 | 69.8 | 0.74 |

Evaluation Results

The results shown in Tables 1 and 2 demonstrate that Examples 1 to 25 have a lower battery resistance, a higher capacity retention rate after the charge and discharge cycle, and a higher capacity retention rate after storage than Comparative Examples 1 to 3. The results shown in Tables 1 and 2 also demonstrate that Examples 2 to 25 have a lower battery resistance, a higher capacity retention rate after the charge and discharge cycle, and a higher capacity retention rate after storage than Example 1 that uses a negative electrode layer including no oxygen-enriched portion.

What is claimed is:

1. A negative electrode for a lithium secondary battery and in which deposition and dissolution reactions of lithium metal occur, the negative electrode comprising, a negative electrode layer, wherein:

the negative electrode layer contains, as a negative electrode active material, an alloy of the lithium metal and a dissimilar metal;

an element percentage of a lithium element in the alloy is 40.00 atomic % or more and 99.97 atomic % or less when the lithium secondary battery is fully charged, the negative electrode layer includes an oxygen-enriched portion in which oxygen is enriched, a sectional area of the oxygen-enriched portion is 1% or more and 60% or less when a sectional area of the negative electrode layer is taken as 100%, and the oxygen-enriched portion and the negative electrode layer are formed simultaneously by at least three crucibles, one containing the lithium metal, one containing the dissimilar metal, and one containing an oxygen-introducing compound, and the at least three crucibles are heated to simultaneously volatilize the lithium metal, the dissimilar metal, and the oxygen-introducing compound in a vacuum deposition apparatus and deposit the lithium metal, the dissimilar metal, and the oxygen-introducing compound.

2. The negative electrode according to claim 1, wherein the dissimilar metal is an element that is able to form a solid solution with the lithium metal or an element that is able to form an intermetallic compound with the lithium metal.

3. The negative electrode according to claim 1, wherein the sectional area of the oxygen-enriched portion is 2% or more and 50% or less when a sectional area of the negative electrode layer is taken as 100%.

* * * * *